UNITED STATES PATENT OFFICE.

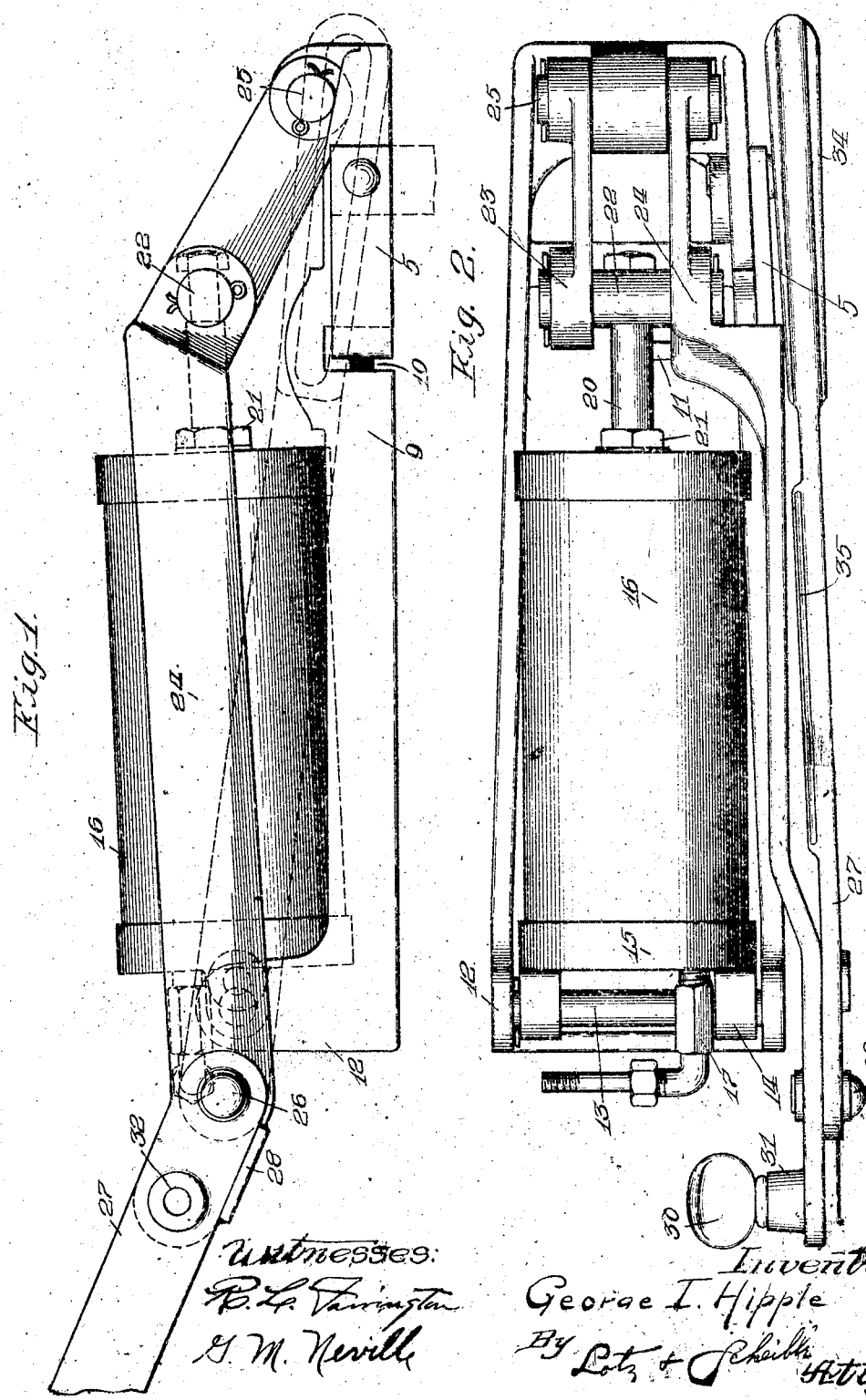

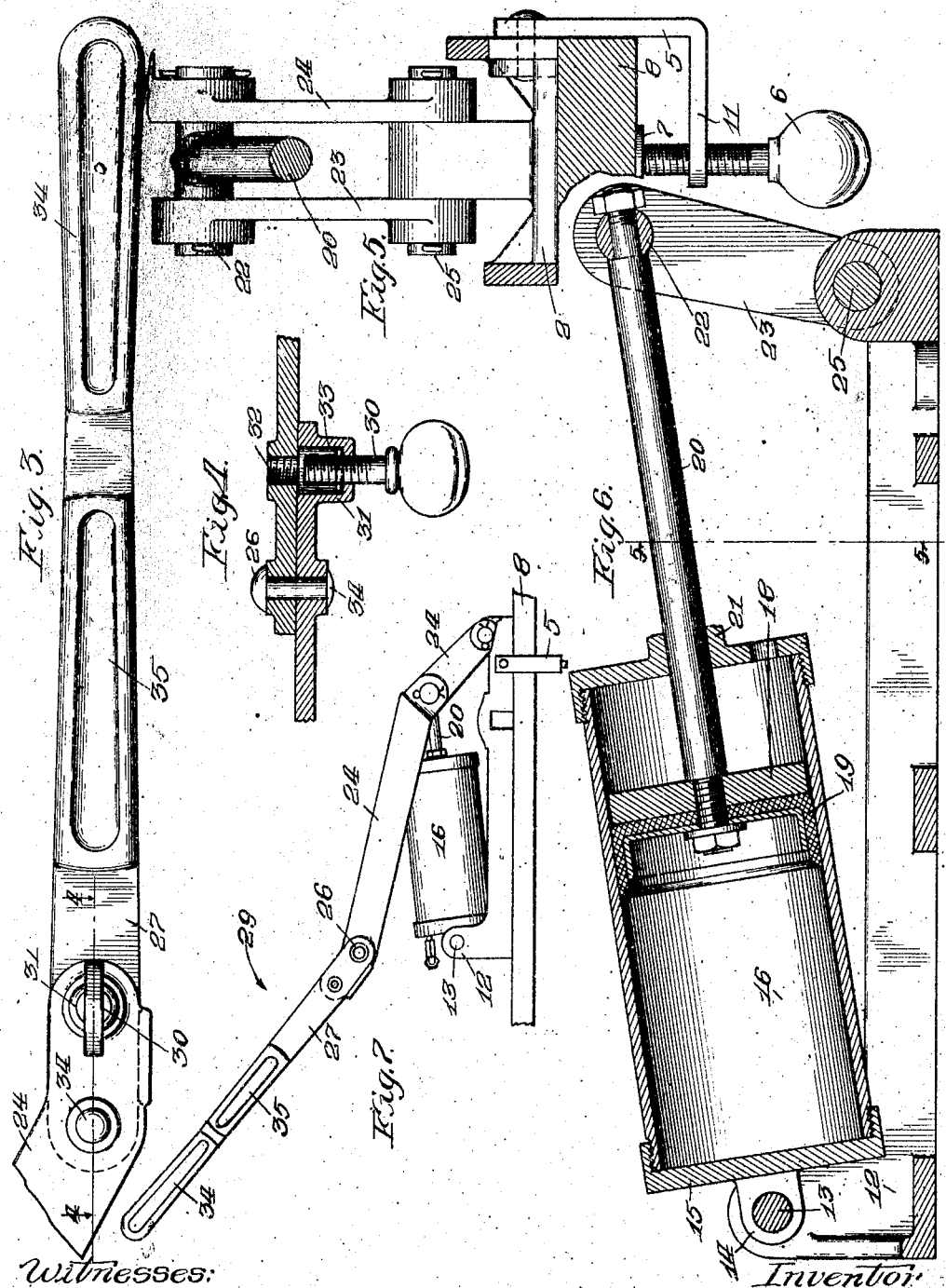

GEORGE I. HIPPLE, OF CHICAGO, ILLINOIS.

TIRE-PUMP.

1,191,510.  Specification of Letters Patent.  Patented July 18, 1916.

Application filed January 27, 1914. Serial No. 814,813.

*To all whom it may concern:*

Be it known that I, GEORGE I. HIPPLE, a citizen of the United States, residing at Chicago, in the county of Cook and State of Illinois, have invented certain new and useful Improvements in Tire-Pumps; and I do hereby declare the following to be a full, clear, and exact description of the invention, such as will enable others skilled in the art to which it appertains to make and use the same.

My invention relates to air-compressing pumps and more particularly to the class of pumps used for inflating the tires of automobiles.

One object of my invention is to provide a tire pump which may readily be attached to the running board or other rigid portion of the frame of a vehicle so as to be firmly held in position when in use, and to equip such a pump with a clamp adapted to be housed by the frame of the vehicle when not in use.

Another object is to equip a manually operable pump with an operating lever adapted to provide great leverage when in use and to be folded into a comparatively small space when not in use.

A further object is to provide the members comprising such a folding lever with simple, manually operable means for rigidly securing the same in their extended relation, and with engaging formations adapted to relieve the said connection of excessive strain when the pump is in use.

Still another object is to equip a pumping mechanism with a lever provided with a plurality of hand-hold formations so disposed that the leverage may readily be varied, so that the pump may be quickly operated at the shorter leverage at the start and may be operated at the greater leverage when the air compression begins to offer considerable resistance to the operation of the pump.

Further objects will appear from the following description and from the accompanying drawings, in which—

Figure 1 is a fragmentary elevation of the pump of my invention, with the members of the operating lever in their extended position. Fig. 2 is a plan view of the pump with the members of the operating lever folded for storage. Fig. 3 is an elevation of the extension portion of the operating lever and of a portion of the main member of the said lever. Fig. 4 is a sectional view through a portion of the lever of Fig. 3, along the lines 4—4. Fig. 5 is a fragmentary end view of the pump showing the method of clamping the same to the running board of the vehicle. Fig. 6 is a central longitudinal section through the pump. Fig. 7 is a reduced elevation of the pump as it appears when in use.

In the drawings, the tire pump of my invention consists essentially of a base or supporting member 1 having a frame 2 adapted to rest upon a running board 3 or other rigid object, and to be clamped to such an object by a clamp 4. The clamp 4 preferably consists of an angle-shaped member 5 pivoted at one end to a side portion of the frame 2 and having a thumb-screw 6 threadedly engaging the other end 11 of the said member and equipped with an enlarged foot 7. When the clamp is disposed substantially at right angles to the frame 2 of the base, the said foot 7 will coact with the base upon rotation of the screw 6 to clamp the board 8 between the base 2 and the foot of the screw, thereby securing the said base and the pump mechanism carried thereby to the board 8. One of the longitudinal members 9 of the base is preferably equipped with a recess 10 adapted to be entered by the end portion 11 of the clamp when the latter is moved to a position substantially parallel with the said frame (as in Fig. 1), so that the said clamp may be substantially housed by the base to make the device more compact for storage.

The supporting member 1 is equipped at one end with a pair of trunnions 12 having pivots for a shaft 13 extending through a pair of lugs 14 upon the rear end 15 of a cylinder 16, which cylinder is equipped with suitable inlet and outlet valves 17. Within the cylinder 16 I position a piston 18 equipped with a suitable packing 19 and with a rod 20 extending slidingly through the forward head 21 of the cylinder and secured at its free end to a cross-bar 22. The cross-bar 22 is pivotally secured to a pair of parallel arms 23 and 24, which arms are pivoted to a common shaft 25 carried by the base 1. The arm 24 is elongated past the cross-bar 22 and is connected near its rear end by a pivot 26 to an extension arm 27, which extension arm may be disposed substantially as an elongation of the arm 24 (as in Fig. 7), whereby the arms 24 and 27 combine to form an operating lever which will be relatively long in proportion to the distance between the cross-bar 22 and the shaft 25, which shaft serves as a fulcrum for the said operating lever. The main portion 24 of the operating lever is equipped with a shoulder formation 28 adapted to engage an adjacent portion of the extension arm 27 so as to transmit the strain from the extension 27 to the main arm 16 when the former is moved in the direction shown by the arrow 29 in Fig. 7, this being the direction in which the operating lever is moved to compress the air in the tire. To prevent a relative motion of the lever portions 27 and 24 upon a motion of the extension portion 27 in the opposite direction, I secure the said lever portions to each other by a thumb-screw 30 slidingly swiveled upon a recessed portion 31 carried by one of the lever portions, the other of said portions being equipped with a thread 32 adapted to be engaged by the said screw. Extending transversely through the shank of the said screw is a suitable fastening, such as a cotter 33, which will prevent the screw from being entirely withdrawn from the recessed portion 31 housing a portion thereof, but which will permit the screw to be retracted sufficiently to enable the lever portions to be moved about their connecting pivot 26 when the lever portions are to be folded along-side of each other as in Fig. 1.

The extension portion 27 of the operating lever is equipped at its outer end with a hand-hold formation 34 adapted to afford a suitable grip so as to prevent a slipping of the hand of the operator, and is also preferably equipped with another hand-hold formation 35 disposed nearer to the pivot 26, each of these formations being bordered by tangibly appreciable ridges which will prevent a slipping of the fingers grasping the formation bordered thereby. It will be obvious from Fig. 7 that the leverage afforded by the operating lever will be varied according to the hand-hold gripped by the operator. It will also be obvious that the shorter leverage will afford less power and will require the arm of the operator to be moved through a shorter distance. Consequently, the operator of my pump can readily work the same speedily by gripping the hand-hold 35 when first starting to use the pump. Then after a sufficient pressure has been created in the tire to offer a considerable resistance to the action of the pump, the operator can readily change his grip to the hand-hold 34, thereby securing the increased leverage. It will also be evident that by drawing back the thumb-screw 30, as in Fig. 4, the lever portions can readily be folded along-side of each other, as in Fig. 2, thereby reducing the pump of my invention to a very compact form for storage.

While I have shown and described the shoulder formation 28 as formed upon the main portion 36 of the operating lever, and have shown the recessed portion 31 as formed upon the extension portion 27 of the said lever, I do not wish to be limited to this or other particular details of the construction herein disclosed, since the latter might be varied considerably without departing from the spirit of my invention as shown in the appended claims.

I claim as my invention:

1. In a pump, the combination with a pumping mechanism, of an operating lever connected thereto, an extension arm pivotally connected at one end to the said lever intermediate of the ends of the latter, and a screw swiveled upon the arm and threadedly engaging the lever to lock the lever against pivotal motion with respect to the arm.

2. In a pump, the combination with a pumping mechanism, of an operating lever connected thereto and comprising two pivotally joined members, the pivotal connection therebetween permitting the said members to be disposed either substantially alongside of each other or substantially in extension of each other; one of said members having a portion extending alongside a portion of the other member when the said members are in their last-named relative position; one of said members equipped with a shoulder formation engaging the other of said last members when the members are in their said last-named position.

3. In a pump, the combination with a pumping mechanism, of an operating lever connected thereto and comprising two pivotally joined members, the pivotal connection therebetween permitting the said members to be disposed either substantially alongside of each other or substantially in extension of each other; one of said members having a portion extending alongside a portion of the other member when the said members are in their last-named relative position; one of said members equipped with a shoulder formation engaging the other of said members when the members are in their said last-named position; and manually operable means for locking the said members in their said last-named position.

4. In a pump, the combination with a pumping mechanism, of an operating lever connected thereto and comprising two pivotally joined members, the pivotal connection therebetween permitting the said members to be disposed either partially overlapped alongside of each other or substantially in extension of each other; one of said members having a portion extending alongside a portion of the other member when the said members are in their last-named relative position; one of said members equipped with a shoulder formation engaging the other of said members when the members are in their said last-named position; and a screw swiveled upon one of said members and threadedly engaging the other thereof when the members are in their said last-named position, the said screw being slidable with respect to the member upon which it is swiveled to permit the screw to be drawn back for allowing the said members to be moved to the other of their said relative positions.

5. In a pump, the combination with a reciprocable piston, of a pivoted operating member operatively connected thereto; and an extension member pivotally joined to the said actuating member and having a portion adapted to be disposed parallel with and overlapping a portion of the said actuating member; and clamping means for securing the said extension member and the said actuating member to each other in their said partially overlapped relation to each other.

6. In a pump, the combination with a reciprocable piston, of a pivoted operating member operatively connected thereto; and an extension member pivotally joined to the said actuating member and having a portion adapted to be disposed parallel with and overlapping a portion of the said actuating member; and means slidably carried by one of the said members for securing the said members to each other in their said partially overlapped relation to each other.

7. In a tire pumping device, the combination with a pump, of a base supporting the same and having an opening therein; and a clamp member movably secured to the said base member and adapted to be projected through the said opening, the said clamp member equipped with means for clamping an object between the said base and a portion of the clamp when the latter is in its said projecting position.

In testimony whereof I have signed my name in presence of two subscribing witnesses.

GEORGE I. HIPPLE.

Witnesses:
ALBERT SCHEIBLE
M. M. BOYLE.